United States Patent
Crooks et al.

(10) Patent No.: US 11,095,801 B2
(45) Date of Patent: Aug. 17, 2021

(54) SCANNER WITH INDEPENDENT INTEGRATED NETWORK VIDEO CAPABILITIES

(71) Applicant: NCR Corporation, Duluth, GA (US)

(72) Inventors: John Crooks, Duluth, GA (US); J. Stephen McDaniel, Suwanee, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 15/251,181

(22) Filed: Aug. 30, 2016

(65) Prior Publication Data

US 2018/0063394 A1    Mar. 1, 2018

(51) Int. Cl.
| | |
|---|---|
| H04N 5/225 | (2006.01) |
| G07G 1/00 | (2006.01) |
| H04N 7/18 | (2006.01) |
| G06K 7/10 | (2006.01) |
| G06K 7/14 | (2006.01) |
| G06K 9/00 | (2006.01) |
| G06K 19/06 | (2006.01) |
| G06Q 20/20 | (2012.01) |
| H04N 5/247 | (2006.01) |
| H04N 21/234 | (2011.01) |
| H04N 21/4223 | (2011.01) |
| H04N 21/61 | (2011.01) |

(52) U.S. Cl.
CPC ....... *H04N 5/2257* (2013.01); *G06K 7/10554* (2013.01); *G06K 7/1417* (2013.01); *G06K 9/00711* (2013.01); *G06K 19/06037* (2013.01); *G06Q 20/208* (2013.01); *G07G 1/0045* (2013.01); *H04N 5/247* (2013.01); *H04N 7/18* (2013.01); *H04N 21/23418* (2013.01); *H04N 21/4223* (2013.01); *H04N 21/6125* (2013.01)

(58) Field of Classification Search
CPC ................. H04N 5/2257; H04N 5/247; H04N 21/23418; H04N 21/4223; H04N 21/6125; G06K 7/10554; G06K 7/1417; G06K 9/00711; G06K 19/06037; G06Q 20/208
USPC .......................................................... 725/9
See application file for complete search history.

(56) References Cited

U.S. PATENT DOCUMENTS

| | | | | |
|---|---|---|---|---|
| 3,757,039 A | * | 9/1973 | Brewer | G08B 13/1963 348/159 |
| 5,494,136 A | * | 2/1996 | Humble | A47F 9/047 186/61 |
| 5,747,784 A | | 5/1998 | Walter et al. | |
| 7,293,711 B2 | * | 11/2007 | Brock | G06K 7/10 235/379 |
| 7,866,546 B1 | * | 1/2011 | Vance | G07G 1/14 235/379 |

(Continued)

FOREIGN PATENT DOCUMENTS

JP      2014 132501 A    7/2014

OTHER PUBLICATIONS

European Search Report dated Jan. 16, 2018 in co-pending European Patent Application 17186836.7.

*Primary Examiner* — Alfonso Castro
(74) *Attorney, Agent, or Firm* — Schwegman, Lundberg & Woessner

(57) ABSTRACT

A scanner is integrated into a Point-Of-Sale (POS) terminal; the scanner provides scanning information during POS transactions over a POS connection and provides video capabilities over a separate and independent network connection.

18 Claims, 4 Drawing Sheets

(56) References Cited

U.S. PATENT DOCUMENTS

| | | | | |
|---|---|---|---|---|
| 8,448,858 B1 * | 5/2013 | Kundu | ............... | G07F 17/3241 |
| | | | | 235/375 |
| 9,124,778 B1 * | 9/2015 | Crabtree | ................. | H04N 7/18 |
| 9,519,901 B1 * | 12/2016 | Dorogusker | ......... | G06Q 20/401 |
| 9,595,029 B1 * | 3/2017 | Catoe | .................... | G06Q 20/18 |
| 9,690,967 B1 * | 6/2017 | Brundage | ............ | G06T 1/0021 |
| 2002/0170782 A1 * | 11/2002 | Millikan | ................. | A47F 9/048 |
| | | | | 186/61 |
| 2006/0043193 A1 | 3/2006 | Brock | | |
| 2008/0199155 A1 * | 8/2008 | Hagens | ................. | H04N 7/141 |
| | | | | 386/291 |
| 2008/0283611 A1 * | 11/2008 | Knowles | ................ | A47F 9/046 |
| | | | | 235/462.42 |
| 2016/0232764 A1 * | 8/2016 | Galvin | ............... | H04N 21/4143 |
| 2016/0328660 A1 * | 11/2016 | Huang | ................. | G07G 1/0045 |
| 2016/0335856 A1 * | 11/2016 | Barkan | ............... | G07G 1/0054 |

\* cited by examiner

SCANNER WITH INDEPENDENT INTEGRATED NETWORK VIDEO CAPABILITIES

BACKGROUND

Point-Of-Sale (POS) devices often include a variety of integrated devices, such as scanners, scales, integrated scanners with scales, card readers with on-screen signature capabilities, and the like.

The scanners also come equipped with multiple cameras, each camera having a limited field-of-view, and the multiple cameras cooperating to obtain a full image of the item (or barcode) being scanned.

Many retailers also use one or more video cameras for security monitoring of checkout stations where the scanners are deployed. Typically, the surveillance cameras are separately interfaced to a retailer's network and to a Network Video Recorder (NVR) system. These surveillance cameras and NVR systems are completely separate and not integrated with the checkout stations and/or scanners, which adds expenses for retailers. Furthermore, some retailers lack the means to maintain separate surveillance cameras and/or NVR systems.

However, cameras available in some scanners do provide limited video capability but access to any captured scanner video is achieved through the checkout station to which the scanner is integrated as a peripheral device. As a result, the processing load of the checkout station is adversely impacted during video capture. Moreover, any configuration of scanner video capture has to be done through the checkout station, which means the checkout station is unavailable for customer checkouts when scanner video configuration is being performed on the scanner.

Still further, the features of existing scanners that capture video are limited. For instance, elaborate post video capture processing typically is needed on a captured video to attempt to obtain useful checkout information occurring when the video was captured (for synchronizing the checkout information with the proper frames in the captured video).

In short, existing scanners that provide video capabilities have added video capture as an afterthought to those scanners, which means that making use of the captured video or video features is proprietary to the manufacturers of the scanners. Consequently, using video features of the existing scanners is: cumbersome, impacts checkout station availability and throughput, and difficult to functionally utilize/analyze/integrate once video has been captured.

SUMMARY

In various embodiments, methods and a checkout station scanner for independent integrated network video capabilities are provided.

According to an embodiment, a method for operating a checkout station scanner with independent integrated network video capabilities is provided. Specifically, a camera is selectively activated for capturing video within a scanner that is integrated within a Point-Of-Sale (POS) terminal. The video is then streamed over a network connection that is independent of and separate from a second network connection between the scanner and the POS terminal.

DETAILED DESCRIPTION

Figure 1:
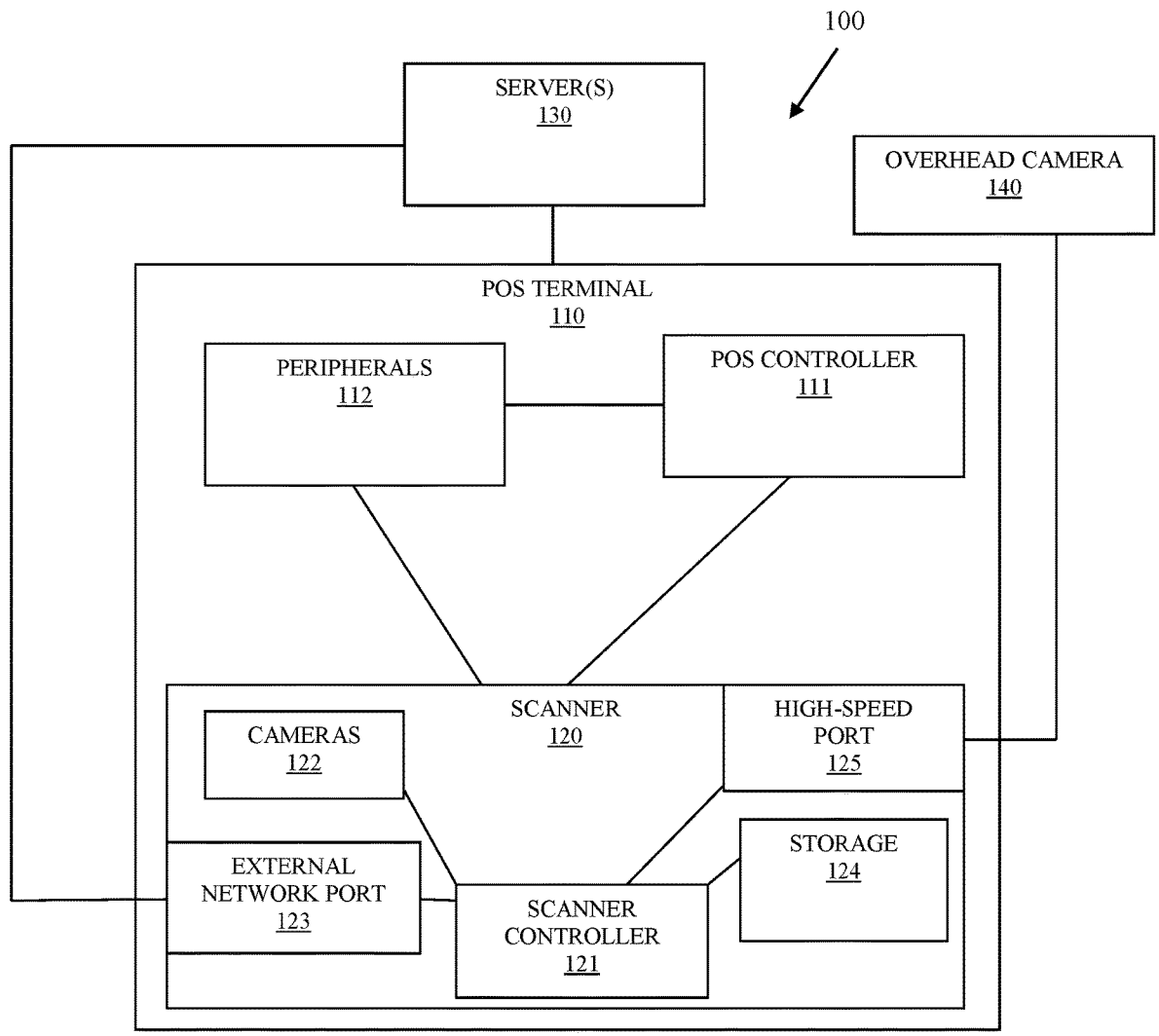
FIG. 1 is a diagram illustrating components of a retail checkout system that includes a Point-Of-Sale (POS) terminal having an integrated scanner and the scanner having independent integrated network video capabilities, according to an example embodiment.

FIG. 1 is a diagram illustrating components of a retail checkout system 100 that includes a Point-Of-Sale (POS) terminal having an integrated scanner and the scanner having independent integrated network video capabilities, according to an example embodiment. It is to be noted that the system 100 is shown schematically in greatly simplified form, with only those components relevant to understanding of this embodiment being illustrated. The same situation may be true for the other various components of the POS terminal 110 (POS terminal 110 may also be referred to herein as a checkout station 110).

Furthermore, the various components (that are identified in the FIG. 1) are illustrated and the arrangement of the components is presented for purposes of illustration only. It is to be noted that other arrangements with more or less components are possible without departing from the teachings of an independent integrated network scanner with video capabilities, as presented herein and below.

Moreover, the methods for scanner operation and the scanner presented herein and below may include all or some combination of the components shown in the retail system 100. The methods are programmed as executable instructions in memory and/or non-transitory computer-readable storage media and executed on one or more processors associated with the components/devices.

Specifically, the retail system 100 is configured to operate a novel scanner 120 independent of the POS terminal 110 to which the scanner 120 is integrated as a peripheral device for providing network video capabilities (surveillance or monitoring video). It is to be noted, however, that information available from the scanner controller 121 in the performance of other POS terminal operations (such as processing a transaction) is still available for processing by the scanner controller 121 during operation of the scanner 120 for video processing.

The retail system includes a POS terminal 110, an integrated scanner 120, at least one server 130, and, optionally, an overhead surveillance camera 140. The POS terminal also includes a POS controller 111 and a variety of other integrated peripheral devices 112 (such as but not limited to: a keyboard, a display, a touch screen, a card reader, a weigh scale, and others). The scanner 120 includes: a scanner controller 121, a plurality of cameras 122, an external network port 123, and on-scanner storage 124.

In an embodiment, the scanner 120 includes an integrated weigh scale or an internal port for connecting to a weigh scale.

The scanner controller 121 is one or more software modules that execute on one or more processors of the scanner or a control/mother board (having memory and one or more processors) associated with the scanner 120, and the control/mother board having electronic componentry to drive the mechanical components of the scanner 120 as directed by the scanner controller 121 and to receive and communicate data instructions and/or data from and to the scanner controller 121.

The scanner controller 121 is interfaced to the cameras 122, the external network port 123, the storage 124, and, optionally, the high-speed port 125 (through data bus connections).

In an embodiment the scanner controller 121 is a new controller installed and configured on the scanner 120 for processing video capabilities and video configuration as discussed herein and below. The new controller 121 performs the video processing and capabilities independent of a separate existing scanner controller assisting in processing POS transactions being processed on the POS terminal 110. The new controller 121 cooperates with the existing controller to manage conflicts occurring with any of the cameras 122 during concurrent video and transaction processing. In an embodiment, the scanner 120 includes a multiprocessor architecture having multiple processors such that new controller 121 and the existing controller 126 process in parallel.

In an embodiment, the scanner controller 121 is an enhanced version of an existing controller installed and configured on the scanner 120 for processing video capabilities and video configuration as discussed herein and below and for assisting in POS transactions being processed by the POS terminal 110.

In an embodiment, the scanner 120 includes 4 cameras 122.

In an embodiment, the scanner 120 includes less than 4 cameras 122.

The external network port 123 provides an independent network connection between the scanner 120 and one or more external servers 130. The servers 130 are external to the POS terminal 110 and accessible over a Local-Area Network (LAN) and/or Wide-Area Network (WAN). The independent network connection is independent of and separate from the connection that the scanner 120 has with the POS terminal 110 for assisting in processing POS transactions.

The POS-related activity occurring over a port connection between the scanner 120 and the POS terminal 110 is not used and does not impact the independent network activity that is being processed over the external network port 123.

In an embodiment, the external network port 123 is an Ethernet port.

In an embodiment, the controller 121 presents through the external network port 123 an ONVIF-enabled protocol interface for receiving video-related configuration instructions and commands and for sending to the server 130 responses. The ONVIF-enabled protocol interface permits the scanner 120 to present as a device for interaction with over a network as part of the Internet-of-Things (IoTs). This permits the scanner 120 to be operated independent from the network independent of scanner-related processing occurring within the POS terminal 110 for POS transaction processing.

In an embodiment, the external network port 123 is a logical port that provides an independent network connection between the scanner controller 121 and the server 130 from a different port associated with a different network connection between the scanner controller 121 and the POS terminal 110.

The scanner controller 121 permits at least two separate network connections simultaneously: one between the scanner controller 121 and the POS terminal 110 for POS transaction processing and a separate one between the scanner controller 121 and the server 130.

In an embodiment, the scanner controller 121 permits a third simultaneous network connection over a high-speed port 125 between the scanner controller 121 and a remotely located camera 140. The remotely located camera 140 is separate from the scanner 120 and the POS terminal 110. In an embodiment, the remotely located (overhead camera) is mounted above the POS terminal 110 for a full field-of-view of the POS terminal 110 and surrounding area of the POS terminal 110. In an embodiment, the third simultaneous connection between the scanner controller 121 and the overhead camera 140 is a serial-bus connection.

The scanner controller 121 is configured to selectively activate and deactivate the cameras 122 of the scanner 120 for purposes of capturing video. The same cameras 122 that are activated by the controller 121 for capturing video are selectively activated to capture, for POS transaction processing by the POS controller 111: barcodes, Quick Response (OR) codes, and still images of items in the field of view of each of the cameras 122.

In an embodiment, a preconfigured amount of any captured video is stored by the controller 121 within the on-scanner storage 124. This permits the scanner controller 121 to operate the scanner as a Network Video Recorder (NVR) with a variety of features provided through an ONVIF protocol interface, such as but not limited to: pausing, rewinding, and fast forwarding recorded video captured through the selective camera 122 activation. This also permits the scanner controller 121 to buffer captured video for more even streaming over the external network port 123 to the server 130 and server-based NVR system. This may be particularly useful when the network connection over the external network port 123 to the server 130 is unavailable or experiencing excessive bandwidth load, such that the video capture can continue during the network issues with recordation in the on-scanner storage 124.

In the embodiment, with the overhead camera 140 connected over the high-speed port 125, the captured video from the camera 140 can be temporarily stored within the storage 124 or directly streamed over the separate network connection through the external network port 123 providing real-time or near real-real lime video on the server as recorded by the overhead camera 140. In an embodiment, the overhead camera 140 is a network-enabled camera connected to the scanner 120 through a Universal Serial Bus (USB) port 125.

The scanner controller 121 can be configured to be remotely initiated over the network between the scanner 120 and the server 130 for purposes of: starting video capture, stopping video capture, pausing video capture, and slowing a bandwidth rate for which captured video is streamed by the controller 121 over the external network port 123 to the server 130. In an embodiment, the captured video is provided over the external network port 123 through Ethernet using ONVIF protocol.

Commands or instructions can be received and processed by the scanner controller 121 from the server 130 while the scanner controller is selectively activating the cameras 122 (and optionally 140) for purposes of streaming live (real time or near real time) video to the server 130 or a server-based NVR system. In an embodiment, these commands or instructions are received while the scanner controller 121 is processing instructions from the POS controller 111 to assisting in processing a POS transaction at the POS terminal.

In an embodiment, at least one command instructs the controller 121 to combine independent camera captured videos from multiple simultaneously activated cameras 122 (at least two cameras and optionally including with those at least two cameras the overhead camera 140) into a combined and single stream for real-time and remote viewing in a tiled format (each independent and separately captured video stream simultaneously visible in a single display window of the device from which the video-streams are being viewed).

In an embodiment, at least one command instructs the controller 121 to cycle through different cameras (122 and/or optionally including overhead camera 124) at a fixed rate or a user-defined rate. Here, the video capturing and/or video streaming over the external network port 123 records video from a starting camera and after the fixed or user-defined period of time passes, the controller 121 activates a next camera 122 and/or 124 and begins video capturing and/or video streaming from the field of view of the next camera 122 and/or 124. This continues until a last camera 122 and/or 124 is reached and cycles backs again to the starting camera 122 and/or 124.

In an embodiment, at least one command instructs the controller 121 to maintain an existing or set camera view (where video is currently being captured) until a user-defined event of interest occurs. In an embodiment, the user-defined event of interest includes, but is not limited to: detection of an item barcode scan from one of the cameras 122 and/or 124, a stable scale weight (communicated by an integrated scale device with the scanner 120), a theft detection (as communicated from the server 130 through a video analysis automated program receiving the streamed video (such as ScanWatch®). When an event of interest is detected by the controller 121, the camera 122 and/or 124 that the controller 121 currently has activated can be have its field of view changed or focused differently or a different camera 122 and/or 124 activated for a different and clearer view of the event activity occurring proximate to the scanner 120.

In an embodiment, the scanner controller 121 is remotely configured for video processing over the external network port 123 and provides recorded and/or live real-time or near-real time vide captured from selected activation of the cameras 122 and/or 124 over the same external network port. Configuration instructions received over the external network port from the server 130 can include instructions for a variety of video processing capabilities (described herein), such as but not limited to, events for determining when to deactivate video capturing, events for activating video capturing, a decreased transmission or frame capture rate of recorded video, tiling multiple video streams into a single transmitted stream, cycling video recording from a defined set or all of the cameras 122 and/or 124, changing video recording from one camera 122 and/or 124 to a different camera 122 and/or 124 based on a detected event or a manually communicated instruction, events for determining when to record the video within the on-scanner storage 124, a size, amount or time duration to record the video within the on-scanner storage 124 before and after detected events, and the like.

In an embodiment, when the scanner controller 121 detects that the scanner 120 is not in use for POS transactions, the scanner controller 121 can deactivate and cease any video capturing occurring with one or more of the cameras 122 and/or 124 or can slow the bandwidth rate that captured video is being streamed by the controller 121 over the external network port 123 to the server 131. This deactivation and/or slowed down bandwidth transmission rate can be activated by the controller 121 based on a variety of situations. In a first situation, the controller 121 detects a new command communicated from the POS controller 111 indicating that the POS terminal 110 is "out of use." The POS controller 111 in this first situation is modified to send the controller 121 the new command when the POS controller 111 detects an event, such as a cashier logging out of a session with the POS terminal 110, the POS terminal 110 is taken out of service with a command. In a second situation, the POS controller 111 is unmodified; rather, the controller 121 determines when the POS terminal 110 is no longer in use. Conventionally, the POS controller 111 will send a disable command to the controller 121, which stops the scanner 120 from scanning or beeping. Such a command is typically sent by the POS controller 111 after each item scan during a given POS transaction to give the POS controller 111 time to: look up the scanned item detail and price and/or perform internal POS terminal 110 calculations for the ongoing POS transaction; this permits the POS controller 111 from being interrupted by the controller 121. In this second situation, the scanner 120 is disabled for a fixed period of time before automatically reactivating itself for continued item scanning during the POS transaction. The controller 121 can be configured to wait an additional period of time (for example 60 seconds beyond the fixed timeout period) and it no item scan is performed at the scanner 120, the controller 121 assumes that the POS terminal 110 is out of service. In a third situation, the controller 121 is configured to detect an extended period of configured time during which no item scan is detected by the scanner 120 (for example 5 minutes), and the controller 121 assumes the POS terminal 110 is out of service after the configured period of time passes with no item scan activity detected. In a fourth situation, the scanner 120 includes a motion detector (not shown in the FIG. 1) and if no motion is detected during a configured period of elapsed time, the controller 121 assumes the POS terminal 110 is out of service. In a fifth situation, one or more cameras 122 are used with image analytics processed on a processor of the scanner 120 with the controller 121 for motion detection and when no motion is detected during a configured period of elapsed time, the controller assumes the POS terminal is out of service.

When the controller 121 makes a determination (using any of the above-described situations) that the POS terminal 110 is out of service, the controller 121 can be configured to stop sending any recorded video from the camera 122 and/or 124. Alternatively, the controller 121 can slow down the image frame capture rate or throttle down the bandwidth rate for the video capturing and/or transmission over the external network port 123.

The controller 121 can determine when to again start capturing video and/or increase the frame or transmission rate when the controller 121 determines that the POS Terminal 110 is back in use. This can occur in a variety of situations, such as: 1) the POS controller 111 sends an "in use" command to the controller 121, 2) the controller 121 detects that the POS controller 111 has sent a generic "enable" command, 3) the controller 121 detects barcode scan activity at one of the cameras 122, and/or 4) the controller 121 detects motion (either through image analytics (as discussed above) or through a separate integrated motion detector of the scanner 120 (not shown in the FIG. 1)).

The controller 121 is also configured for integrating novel metadata to include with the captured video. The metadata is scanner-specific. This metadata can include, by way of example only, scanner-detected events, electronic article surveillance (EAS) events, current weigh scale status and weight, and other data unique to the scanner 120. The controller 121 can add the metadata in a variety of manners. For example, burning text representing the metadata directly into the captured video images or sending the unique metadata as ONVIF "event services," such metadata is synchronized frame-by-frame with the captured video.

In an embodiment, the scanner controller 121 can manage at least one additional remote camera in addition to the overhead camera 140. This can be done through an additional port interface or through the high speed port 125 that is initially connected to a hub with the hub connecting to the overhead camera 124 and at least one additional remote camera.

In an embodiment, where the scanner 120 utilizes the storage 124 as an on-scanner NVR, the controller 121 can be configured to record video for configured periods of time before and after detected events (for example a barcode scan). This reduces the storage size requirement for the storage 124 when the scanner 120 also serves as an on-scanner NVR.

One now appreciates that a scanner 120 integrated within a FOS terminal 110 can provided video capabilities over an independent network connection that is independent and separate from the scanner's connection with the POS terminal 110. The cameras 122 and/or 124 of the scanner 120 can provide video during or independent of item scan activity at the POS terminal 110. A variety of video capabilities can be provided, providing improved surveillance video in proximity to a POS terminal 110 with improved memory, storage, and bandwidth management for the scanner 120 from that which has been achieved to date with conventional POS scanners.

These and other embodiments are now discussed with reference to the FIGS. 2-4.

Figure 2:
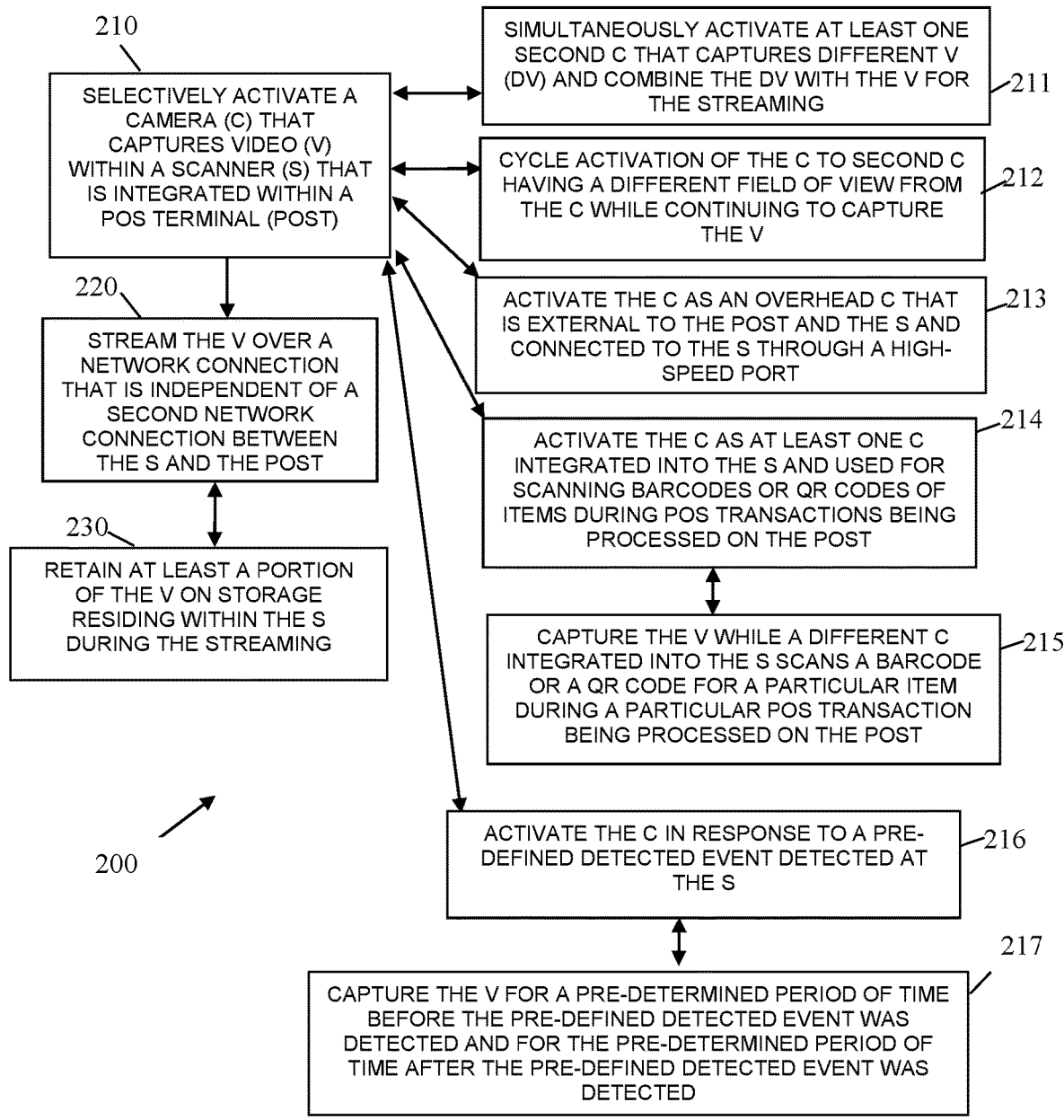
FIG. 2 is a diagram of a method for independently operating a scanner with network video capabilities, according to an example embodiment.

FIG. 2 is a diagram of a method 200 for independently operating a scanner with network video capabilities, according to an example embodiment. The software module(s) that implements the method 200 is referred to as a "POS scanner video controller." The POS scanner video controller is implemented as executable instructions programmed and residing within memory and/or a non-transitory computer-readable (processor-readable) storage medium and executed by one or more processors of a POS scanner. The processor(s) of the scanner that executes the POS scanner video controller are specifically configured and programmed to process the POS scanner video controller. The POS scanner video controller has access to multiple networks during its processing.

In an embodiment, the scanner is the scanner 120 of the FIG. 1.

In an embodiment, the POS scanner video controller is the controller 121 of the FIG. 1.

In an embodiment, the POS terminal 110 having the scanner 120 and the POS scanner video controller as controller 121 is one of: a kiosk, a Self-Service Terminal (SST), an Automated Teller Machine (ATM), and a cashier-assisted Terminal.

At 210, POS scanner video controller selectively activates a camera that captures video within a scanner. The scanner is integrated within a POS terminal. The selective activation can be based on a current processing mode of the scanner, a detected event, a received command, and/or a configuration of the scanner.

According to an embodiment, at 211, the POS scanner video controller simultaneously activates at least one second camera that captures different video. The POS scanner video controller combines the video captured from the camera and the different video from the second camera to form a single video stream as the video being captured. This permits a tiled view of two separate video feeds from two separate cameras of the scanner.

In an embodiment, at 212, the POS scanner video controller cycles activation of the camera to a second camera, which has a different field of view from the camera while the POS scanner video controller continues to capture video. This is the camera cycling video capability discussed above with the FIG. 1.

In an embodiment, at 213, the POS scanner video controller activates the camera as an overhead camera that is external to the POS terminal and the scanner and connected to the scanner through a high-speed port. In an embodiment, the overhead camera is the overhead camera 140.

In an embodiment, at 214, the POS scanner video controller activates the camera as at least one camera that is integrated into the scanner and used for scanning barcodes or QR codes of items during POS transactions being processed on the POS terminal.

In an embodiment of 214 and at 215, the POS scanner video controller captures the video while a different camera integrated into the scanner scans a barcode or a QR code for a particular item during a particular POS transaction being processed on the POS terminal.

In an embodiment, at 216, the POS scanner video controller activates the camera in response to a predefined detected event that is detected by the POS scanner video controller on the scanner.

In an embodiment of 216 and at 217, the POS scanner video controller captures the video for a pre-determined period of time before the predefined detected event was detected and for the pre-determined period of time after the predefined detected event was detected.

At 220, the POS scanner video controller streams the video over a network connection that is independent of a second network connection between the scanner and the POS terminal. In an embodiment, the network connection over which the video is streamed is an Ethernet connection. In an embodiment, the protocol interface used for communicating the video is an ONVIF protocol interface.

According to an embodiment, at 230, the POS scanner video controller retains at least a portion of the video on storage residing within the scanner during the streaming.

In an embodiment, the POS scanner video controller streams the video over the network connection in real time or near real time.

In an embodiment, the POS scanner video controller streams the video over the network connection from buffered storage residing within the scanner.

Figure 3:
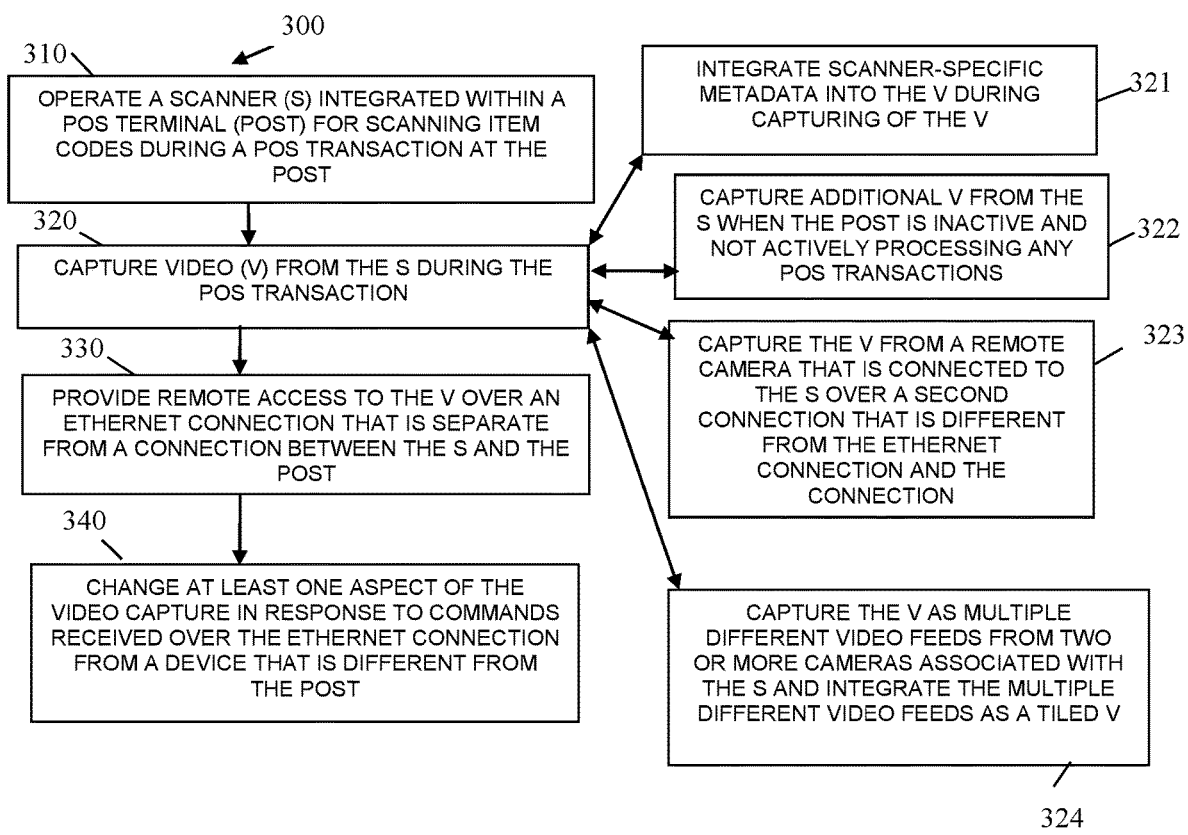
FIG. 3 is a diagram of another method for independently operating a scanner with network video capabilities, according to an example embodiment.

FIG. 3 is a diagram of another method 300 for independently operating a scanner with network video capabilities, according to an example embodiment. The software module(s) that implements the method 300 is referred to as a "scanner video controller." The scanner video controller is implemented as executable instructions programmed and residing within memory and/or a non-transitory computer-readable (processor-readable) storage medium and executed by one or more processors of a scanner. The processors that execute the scanner video controller are specifically configured and programmed to process the scanner video controller. The scanner video controller has access to multiple networks during its processing.

The scanner video controller presents another and perhaps enhanced perspective of the method 200.

In an embodiment, the scanner video controller is the controller 121.

In an embodiment, the scanner video controller is the method 200.

In an embodiment, the scanner video controller is all or some combination of the method 200 and the controller 121.

In an embodiment, the scanner that executes the scanner video controller is the scanner 120.

In an embodiment, the POS terminal 110 that includes the scanner 120 and the scanner video controller as the controller 121 is one of: a kiosk, a SST, an ATM, and a cashier-assisted terminal.

At 310, the scanner video controller operates a scanner integrated within a POS terminal for scanning item codes during a POS transaction at the POS terminal.

At 320, the scanner video controller captures video from the scanner during the POS transaction.

In an embodiment, at 321, the scanner video controller integrates scanner-specific metadata into the video during capture of the video. This can be done via burning the metadata into the video as text appearing in the video or through ONVIF features as discussed above.

In an embodiment, at 322, the scanner video controller captures additional video from the scanner when the POS terminal is inactive and not actively processing any POS transactions.

In an embodiment, at 323, the scanner video controller captures the video from a remote camera that is connected to the scanner over a second connection that is different from the Ethernet connection and the connection (discussed at 330).

In an embodiment, at 324, the scanner video controller captures the video as multiple different video feeds from two or more cameras associated with the scanner. The scanner video controller then integrates the multiple different video feeds as a singled tiled video.

At 330, the scanner video controller provides remote access to the video over an Ethernet connection that is separate from a connection between the scanner and the POS terminal.

According to an embodiment, at 340, the scanner video controller changes at least one aspect of the video capture in response to commands received over the Ethernet connection from a device that is different from the POS terminal.

Figure 4:
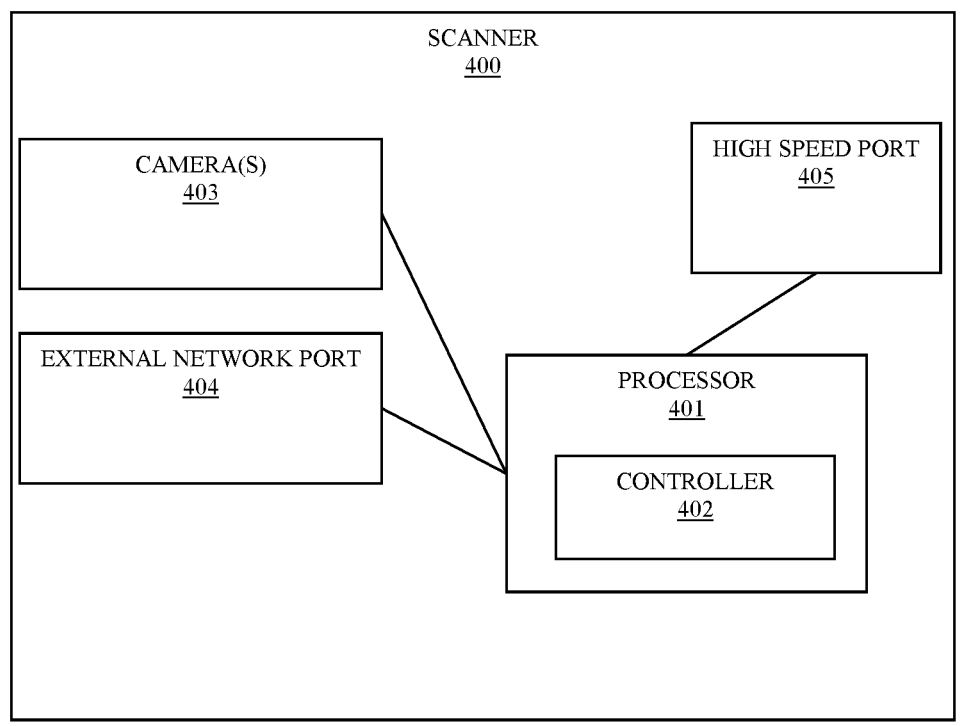
FIG. 4 is a diagram of scanner, according to an example embodiment.

FIG. 4 is a diagram of scanner 400, according to an example embodiment. Some components of the scanner 400 are programmed and reside within memory and/or a non-transitory computer-readable medium and execute on one or more processors of the scanner 400. The scanner 400 communicates over multiple networks.

In an embodiment, the scanner 400 is the scanner 120 of the FIG. 1.

In an embodiment, the scanner is integrated or interfaced to the POS terminal 110 of the FIG. 1. In an embodiment, the POS terminal 110 is one of: a kiosk, a SST, an ATM, and a cashier-assisted terminal.

The scanner 400 includes a processor 401, a controller 402, one or more cameras 403, an external network port 404, and, optionally, a high-speed port 405.

The controller 402 is configured to: execute on the processor 401, activate the one or more cameras 403 in response to a POS terminal to scan an item during a POS transaction, wherein the scanner 400 is connected to the POS terminal through a first network port, activate the one or more cameras 403 to capture video, and provide the video over the external network port 404, wherein the external network port 404 is independent, separate, and different from the first network port.

In an embodiment, the controller 402 is the controller 121.

In an embodiment, the controller 402 is the method 200.

In an embodiment, the controller 402 is the method 300.

In an embodiment, the controller 402 is all or some combination of the controller 121, the method 200, and/or the method 300.

In an embodiment, the external network port 404 is an Ethernet port. In an embodiment, the controller 402 is further configured to: communicate the video over the Ethernet port and process instructions to change video capabilities of the scanner 400 received over the Ethernet port using an ONVIF protocol interface.

In an embodiment, the one or more cameras 403 is two cameras including a first camera integrated into the scanner 400 and a second camera that is remotely located from the scanner 400 and the POS terminal, and the second camera connected to the scanner 400 over a high-speed port 405.

In an embodiment, the one or more cameras 403 are five or more cameras, four integrated into the scanner 400 and one or more remotely located from the scanner 400 and the POS terminal, and the remotely located cameras connected to the scanner 400 over a high-speed port 405 (with or without a hub).

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:

processing, by a scanner connected to a Point-Of-Sale (POS) terminal as a peripheral device of the POS terminal, barcodes or Quick Response (QR) codes during POS transactions that are being processed by the POS terminal, wherein the scanner comprises a multi-processor architecture comprising multiple processors that process in parallel providing independent video processing for video and transaction processing for the POS transactions being processed by the POS terminal;

selectively activating, by the scanner, a camera that captures the video over a high speed data connection;

buffering, by the scanner, portions of the video in a storage of the scanner;

streaming, by the scanner, the portions of the video from the storage over a network connection port to a server, wherein the network connection port is independent of a peripheral connection between the scanner and the POS terminal, and wherein the peripheral connection is accessed during the processing of the barcodes or the QR codes for the POS transactions;

processing, by the scanner, the POS transactions over the peripheral connection with the POS terminal while simultaneously and independently streaming, by the scanner in parallel and using the multiple processors, the portions of the video over the network connection from the storage to the server;

managing, by the scanner, conflicts during concurrent video capturing by the camera that conflict with processing the barcodes or the QR codes and the video being captured during the POS transactions being processed with the POS terminal by the multiple processors cooperating for the managing of the conflicts;

presenting, by the scanner, as an Internet-of-Things (IoTs) device over the network connection for interaction and operation independent of scanner-related processing associated with the POS transaction; and operating, by the scanner, as a Network Video Recorder (NVR) for pausing, rewinding, and fast-forwarding recorded video stored on the scanner.

2. The method of claim 1 further comprising, processing at least one configuration instruction received over the network connection that changes existing video recording capabilities provided from and on the scanner.

3. The method of claim 1, wherein selectively activating further includes simultaneously activating at least one second camera that captures different video and combining the different video with the video for the streaming.

4. The method of claim 1, wherein selectively activating further includes cycling activation of the camera to a second camera connected to the scanner, wherein the second camera has a different field of view from the camera while the scanner continues buffering the video in the storage.

5. The method of claim 1, wherein selectively activating further includes activating the camera as an overhead camera that is external to the POS terminal and the scanner and connected to the scanner through a high-speed port.

6. The method of claim 1, wherein selectively activating further includes activating the camera as at least one camera integrated into the scanner and used for scanning the barcodes of the QR codes during the POS transactions being processed on the POS terminal.

7. The method of claim 6, wherein activating further includes capturing the video while a different camera integrated into the scanner scans a particular barcode for a particular item during a particular POS transaction being processed on the POS terminal.

8. The method of claim 1, wherein selectively activating further includes activating the camera in response to a pre-defined detected event detected at the scanner.

9. The method of claim 8, wherein selectively activating further includes capturing the video for a pre-determined period of time before the pre-defined detected event was detected and for the pre-determined period of time after the pre-defined detected event was detected.

10. A method, comprising:

operating a scanner comprising a multiprocessor architecture comprising multiple processors that process in parallel and providing independent video processing for video captured by the scanner and transaction processing for a Point-Of-Sale (POS) transaction being processed by a POS terminal that is connected to the POS terminal, wherein the scanner is a peripheral device of the POS terminal for scanning item codes during the POS transaction at the POS terminal;

scanning, by the scanner, the item codes and providing, by the scanner the item codes over a peripheral connection between the scanner and the POS terminal during the POS transaction;

capturing, by the scanner, the video during the POS transaction, wherein capturing further includes capturing the video over a high speed data connection between the scanner and a camera;

buffering the video in a storage of the scanner;

providing, by the scanner, remote access to the video over an independent Ethernet connection to a server, wherein the independent Ethernet connection is separate from the peripheral connection between the scanner and the POS terminal, wherein the peripheral connection provides the item codes to the POS terminal during the POS transaction;

simultaneously and independent of processing being performed by the scanner for the POS transaction providing, by the scanner in parallel using the multiple processors, access to the video over the Ethernet connection to the server during the POS transaction without impacting processing of the POS transaction occurring over the peripheral connection;

managing, by the scanner, conflicts during concurrent video capturing by the camera that conflict with scanning the item codes and the video being captured during the POS transaction being processed with the POS terminal by the multiple processors cooperating for the managing of the conflicts;

presenting, by the scanner, as an Internet-of-Things (IoTs) device over the independent Ethernet connection for interaction and operation independent of scanner-related processing associated with the POS transaction; and operating, by the scanner, as a Network Video Recorder (NVR) for pausing, rewinding, and fast-forwarding recorded video stored on the scanner.

11. The method of claim 10 further comprising, changing at least one aspect of the video capturing in response to commands received over the Ethernet connection from the server.

12. The method of claim 10, wherein capturing further includes integrating scanner-specific metadata into the video during capturing of the video.

13. The method of claim 10, wherein capturing further includes capturing additional video from the scanner when the POS terminal is inactive and not actively processing any POS transactions.

14. The method of claim 10, wherein capturing further includes capturing the video as multiple different video feeds from the camera and at least one additional camera connected to the scanner and integrating the multiple different video feeds as a tiled video.

15. A scanner, comprising:

a multiprocessor architecture comprising:
  processors;
  at least one camera;
  a controller;
  a peripheral port;
  and
  an external network port;
  wherein the controller is configured to:
  (i) execute on at least one of the processors, (ii) activate, the at least one camera in response to a Point-Of-Sale (POS) terminal to scan an item barcode during a POS transaction, wherein the scanner provides the item barcode to the POS terminal over the peripheral port, and wherein the scanner is connected to the POS terminal over the peripheral port as a peripheral device of the POS terminal, (iii) activate the at least one camera to capture video over a high speed data connection between the scanner and the at least one camera, and buffer portions of the video in storage on the scanner, (iv) provide the portions of the video over the external network port from the storage of the scanner, wherein the external network port is independent, separate, and different from the peripheral port and the high speed data connection and external network port is accessed without interfering with processing of the POS transaction over the POS transaction being accessed over the peripheral port, wherein the peripheral port is used by the scanner to provide the item barcode for an item during the POS transaction and simultaneously and independently, the external network port is used to provide the portions of the video during the POS transaction to a server from the storage of the scanner using the processors of the multiprocessor architecture to process the video in parallel with processing of the POS transaction; (v) modify a bandwidth rate for which the portions of the video are provided to the server based on a server bandwidth associated with a server connection between the scanner and the server over the external network port, (vi) manage conflicts during concurrent and processing of the item barcode and video processing associated with the video being captured during the POS transaction by the multiple processors cooperating for the managing of the conflicts; (vii) present the scanner as an Internet-of-Things (IoTs) device over the external network port for interaction and operation independent of scanner-related processing associated with the POS transaction; and (viii) operate the scanner as a Network Video Recorder (NVR) for pausing, rewinding, and fast-forwarding recorded video stored on the scanner.

16. The scanner of claim 15, wherein the external network port is an Ethernet port.

17. The scanner of claim 16, wherein the controller is further configured to: (v) communicate the video over the Ethernet port and process instructions to change video capabilities of the scanner received over the Ethernet port using a protocol interface that presents the scanner as a device for interaction through the Ethernet port.

18. The scanner of claim 15, wherein the at least one camera is two cameras including a first camera integrated into the scanner over a bus connection and a second camera that is remotely located from the scanner and the POS terminal, and the second camera connected to the scanner over high-speed data connection.

* * * * *